United States Patent [19]
Gullion

[11] Patent Number: 6,053,127
[45] Date of Patent: Apr. 25, 2000

[54] STIMULATION OF OVULATION IN A MARE

[76] Inventor: Deborah Gullion, 1826 C Rockland Dr., Wenatchee, Wash. 98801

[21] Appl. No.: 08/962,941

[22] Filed: Oct. 28, 1997

Related U.S. Application Data

[60] Provisional application No. 60/029,366, Oct. 28, 1996.

[51] Int. Cl.[7] .......................... A01K 21/00; A01K 29/00
[52] U.S. Cl. ............................... 119/719; 119/174
[58] Field of Search ..................... 119/174, 712, 119/719

[56] References Cited

U.S. PATENT DOCUMENTS

| | | | |
|---|---|---|---|
| 3,099,248 | 7/1963 | Giles et al. | 119/719 X |
| 5,483,924 | 1/1996 | Whitaker | 119/174 X |

OTHER PUBLICATIONS

"The Detection of Oestrus in Mares by Behavioural Appraisal", J. Veeckman, Labo Psychobilogie, Belgium, pp. 601–604, (No date avail).

"Preliminary Studies on the Behavioural Detection of Oestrus in Belgian 'warm–Blood' Mares with Acoustic and Tactile Stimuli", J. Veeckman et al., *Applied Animal Ethology*, 4, 1978, pp. 109–118.

"Utilizing Taped Stallion Vocalizations as a Practical Aid in Estrus Detection in Mares", C.A. McCall, *Applied Animal Behaviour Science*, 28 (1991), pp. 305–310.

*Primary Examiner*—Robert P. Swiatek
*Attorney, Agent, or Firm*—Lane, Aitken & McCann

[57] ABSTRACT

In a method of teasing a mare to ovulation, an audio tape recording is made of the voice of a sexually aroused stallion or gelded teaser. The tape is repeatedly played in the vicinity of the mare over a period of several days to stimulate the mare to ovulation.

2 Claims, No Drawings

STIMULATION OF OVULATION IN A MARE

This application claims the benefit of U.S. Provisional Application No. 60/029,366, filed Oct. 28, 1996.

This invention relates to a method of stimulating a mare towards ovulation without the use of a teaser.

BACKGROUND OF THE INVENTION

Before a mare is bred a stallion, the mare normally has to be teased by a stallion, or by a horse known in the art as a teaser, toward ovulation. The mare becomes breedable just before and as she is entering her ovulation cycle. In the breeding industry, prior to this invention, the function of stimulating the mare towards ovulation was usually performed by a teaser which is a horse kept specifically for this purpose. A teaser may be a stallion or a gelding which gelded after he reached sexual maturity. The stallions used for breeding are not normally used to perform the teasing function.

Typically, a brood mare owner will not own his own teaser and will have to procure the services of a teaser. This usually means that the mare has to be transported to the barn of the teaser and be stabled at the barn of the teaser for several days. Typically, a teaser will be provided at the breeding establishment of the stallion to which the mare is to be bred and the mare will be stabled at the breeding farm of the stallion for several days prior to being bred with the stallion so that the teasing function can be carried out. The stabling of the mare at the breeding farm of the stallion and the use of the teaser involves substantial expense to the mare owner. If the mare owner has his own teaser, an expense is still involved in the cost of the teaser and the care and feeding of the teaser.

The present invention achieves the stimulation of the mare to ovulation without the use of a live teaser and thus avoids the expense and inconvenience of using a teaser to stimulate the mare to ovulation.

SUMMARY OF THE INVENTION

In accordance with the invention, an audio tape of a voice of a sexually aroused male horse, preferably a stallion, is made. Sexually aroused stallions are quite vocal and the sounds they make when sexually aroused are quite unique and different than the sounds that stallions make when otherwise excited such as in connection with aggression toward other stallions or by fear. In accordance with the invention, the tape recording is played back near the mare so she can hear the voice of a sexually aroused stallion. The playing of the tape is repeated periodically over a period of several days until the mare approaches ovulation whereupon the mare will be bred to a stallion.

DESCRIPTION OF A PREFERRED EMBODIMENT

In accordance with the invention, the voice of a male horse, in a state of sexual arousal is recorded on magnetic tape. The audio recording is preferably of a sexually aroused stallion, but it could also be the voice of a gelded teaser. The stallion or teaser selected to make the recording is one that has a voice that is effective in stimulating a mare to ovulation. The recording of stallion voice should be of sufficient duration to be effective in stimulating a mare to ovulation and preferably is from two to three minutes in length. In a specific embodiment of the invention, the length of the recorded stallion voice segment is 2 minutes and 15 seconds. In a portion of the tape prior to the recording of a stallion's voice, a set of orally stated instructions as to how to use the tape is recorded. To stimulate a mare, the tape recording is played to reproduce the voice of a stallion preferably for at least two minutes at a location near the mare, which upon hearing the audio reproduction is stimulated toward ovulation. The varying intensity of the voice of the sexually aroused stallion causes the mare to progress through her heat cycle. The mare is observed as the tape is played and she will reveal her individual heat signs as she progresses to a breedable condition.

The use of the tape provides the following advantages:

It places control of the mare during teasing with the mare owner rather than the breeding farm where the mare will be bred.

It enables the mare owner to learn the individual heat signs and cycle of the mare.

It assists in achieving consistent heat cycles in the mare.

It helps the mare owner to project breeding dates for the mare.

It allows the mare owner to keep the mare at her home through teasing and pre-breeding cycling.

It saves on breeding farm care costs for the mare.

It lowers percentage of accidents, weight loss and stress related to off-home premises care during teasing and cycling.

It helps schedule show dates around mares with difficult heat cycles.

It relieves stress on stallions from constant teasing.

It eliminates the need for a live teaser.

It allows a mare owner to test tease his mare 15 to 18 days after breeding to establish conception.

Directions for the use of audio tape is as follows:

Day 1

The tape is played through once to understand the instructions recorded on the tape.

The mare is placed and tied by halter in a secure, quiet area.

The entire tape segment of the stallion's voice is reproduced at a location 5 to 8 feet behind mare.

The actions of the mare are again noted.

The mare is returned to her stall or pasture.

Day 3

The mare is returned to the secure, quiet area and the tape is played through the stallion's voice segment from 4 to 5 feet behind mare.

The stallion's voice segment is replayed and the mare is again removed to her stall or pasture.

This process is repeated every other day until the mare's individual heat signs are recognized.

Some mares show very subtle signs of heat. An example is a mare who stands quietly through the playing stallion teasing segment for a few teasings, then starts switching her tail for a few teasings, and then begins to stand quietly while teasing. The mare was showing her individual cycle heat signals. Those days on which the mare stood quietly, the mare was starting to ovulate and her actions may be her only indication that she would allow herself to be bred. The days just before the mare ovulates are the days on which the mare is breedable. After cycling the mare 2 or 3 times, the dates of ovulation can be recorded to establish her ovulation and preset her breeding dates. The mare owner, by observing the teaser process, has educated himself about his mares' cycles and has been in control of the whole operation.

The tape recording of the excited stallion's voice is a revolutionary new concept that will streamline the mare owner's breeding program. The use of the tape is economic, efficient and safe.

I claim:

1. An audio recording comprising a recorded segment of the voice of a sexually aroused male horse and a recorded segment of verbal instructions as to how to use the recorded segment of the sexually aroused voice of a male horse to stimulate a mare to ovulation.

2. An audio recorded as recited in claim 1, wherein said recorded segment of the voice of the sexually aroused male horse at least 2 minutes in length.

* * * * *